United States Patent [19]

Morgan

[11] 4,306,640
[45] Dec. 22, 1981

[54] MULTI-RANGE HYDRAULIC DRIVE

[75] Inventor: George H. Morgan, South Bend, Ind.

[73] Assignee: Lambert Brake Corporation, St. Joseph, Mich.

[21] Appl. No.: 65,090

[22] Filed: Aug. 9, 1979

[51] Int. Cl.³ .............................................. F16D 67/04
[52] U.S. Cl. ............................. 192/0.094; 192/0.098; 192/12 C; 74/665 D; 180/308
[58] Field of Search ................. 192/3 N, 0.094, 0.098, 192/12 C, 13 R, 4 A, 3.58; 60/716, 718; 74/732, 661, 665 D, 417; 180/54 C, 305, 307, 308

[56] References Cited

U.S. PATENT DOCUMENTS

| | | | |
|---|---|---|---|
| 2,796,317 | 6/1957 | Valenti et al. | 74/665 D |
| 2,826,255 | 3/1958 | Peterson | 192/12 C |
| 2,833,382 | 5/1958 | Murray et al. | 192/0.098 |
| 2,860,713 | 11/1958 | Peterson | 192/0.098 |
| 2,949,817 | 8/1960 | Feindler | 74/665 D |
| 3,460,656 | 8/1969 | Swanson | 192/0.098 X |
| 3,683,719 | 8/1972 | Gros | 74/661 |

*Primary Examiner*—George H. Krizmanich

*Attorney, Agent, or Firm*—Trexler, Bushnell & Wolters, Ltd.

[57] ABSTRACT

A multi-speed hydrostatic drive is disclosed. The drive comprises the combination of a drive unit having at least one output connectable to a motive member and at least first and second inputs. A clutch unit is connected to the first drive unit input, and a first fixed displacement hydraulic motor is connected to the clutch unit so as to drive the drive unit first input through the clutch when the clutch is engaged. A brake unit is connected to the second drive unit input. A second fixed displacement hydraulic motor is connected to the brake unit so as to drive the drive unit second input when the brake is disengaged. A variable displacement hydraulic pump is also provided. A hydraulic circuit delivers the pressurized fluid to the first and to the second hydraulic motors to provide a relatively low speed, high torque drive. Alternatively, the hydraulic circuit can be set to deliver pressurized fluid to the second motor only to provide a relatively high speed, low torque drive to the motive member.

9 Claims, 2 Drawing Figures

MULTI-RANGE HYDRAULIC DRIVE

BACKGROUND OF THE INVENTION

Hydrostatic drives have found extensive use in providing motive power in tracked vehicles such as crawler tractors, excavators, and military tanks. Wheeled vehicles such as road rollers, agricultural combines, and others also use hydrostatic drives.

Dual range or two-speed hydrostatic drives are often desirable in such equipment. Throughout a low range, relatively low vehicle speed but high drive torque is provided for travel over difficult terrain. In a high range, relatively high vehicle speed and lower drive torque is provided.

Many of these previously offered hydrostatic drive devices use relatively large and expensive hydraulic pumps and motors to provide the motive power for the vehicle. To provide the desired dual range feature, it has often been necessary to provide costly, complex shifting mechanisms, two-speed drop boxes, and other apparatus.

It is accordingly a general object of the present invention to provide a dual-speed hydrostatic drive which is rugged, yet which requires but few major elements.

More specifically, it is an object to provide a hydrostatic drive which uses relatively small and inexpensive hydraulic pumps and motors.

Conversely, it is an object to provide a hydrostatic drive which provides increased theoretical start-up torque and increased maximum speed without requiring larger hydraulic pumps and motors.

Other objects and advantages of the invention will become apparent upon reading the following detailed description and upon reference to the drawings. Throughout the drawings, like reference numerals refer to like parts.

DETAILED DESCRIPTION

Figure 1:
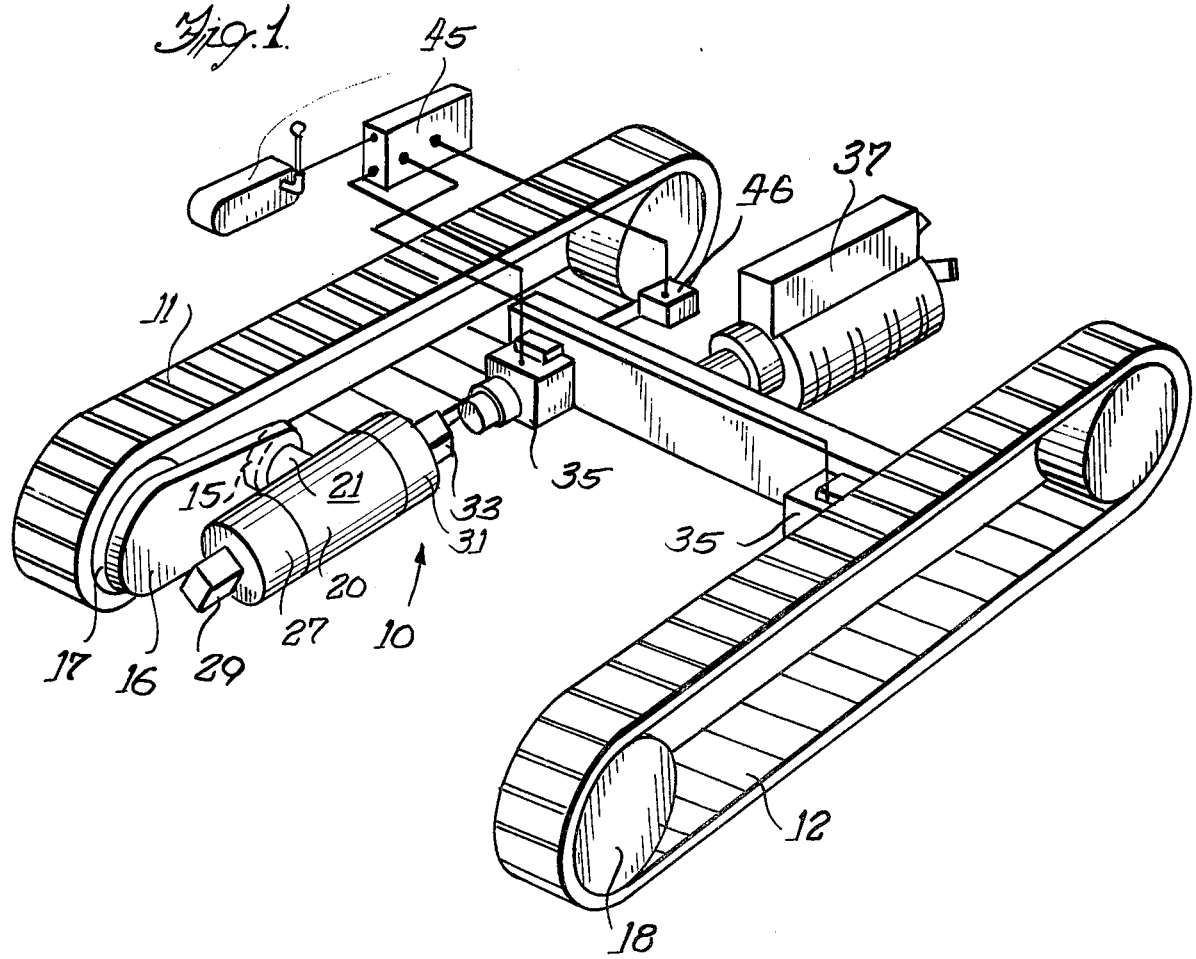
FIG. 1 is a perspective view showing the motive tracks of a tracked vehicle, and in schematic form, the hydrostatic drive of the present invention.

While the invention will be described in connection with the preferred embodiment, it will be understood that it is not intended to limit the invention to this embodiment. On the contrary, it is intended to cover all alternatives, modifications and equivalents as may be included within the spirit and scope of the invention as defined by the appended claims.

Turning more particularly to the drawings, there is shown a novel multi-speed drive 10 for a vehicle having crawler tracks 11 and 12. As may be envisioned particularly from FIG. 1, a motive member 15 (here, a pinion sprocket) drives an endless roller chain or other transmission device 16. This transmission powers a track sprocket wheel 17 to operate the track 11. Similar mechanism (not shown) drives an opposite sprocket wheel 18 and track 12.

Figure 2:
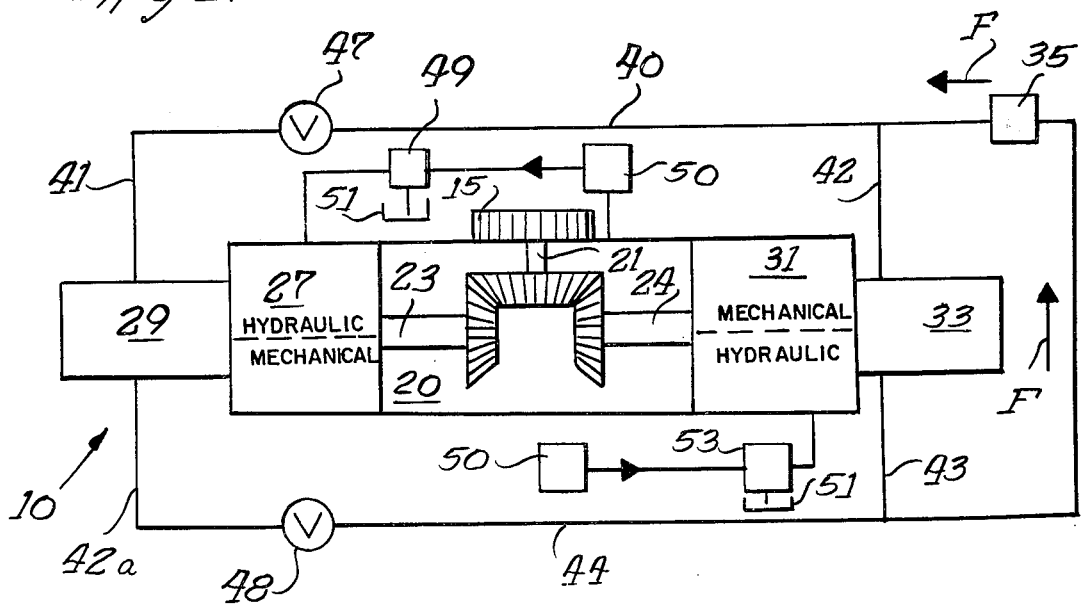
FIG. 2 is a schematic drawing showing the hydrostatic drive and associated hydraulic circuitry of the present invention.

In accordance with the invention, no extensive, expensive, drop boxes or similar devices are required. Rather, as shown particularly in FIG. 2, this novel multi-speed drive 10 includes a drive unit 20 having at least one output 21 connected to the motive member 15, a first drive input 23 and a second drive input 24. A right angle drive device such as that designated as a model RA701 or RA702 right angle drive offered by the Fairfield Manufacturing Company, of Lafayette, Indiana, may be used.

A clutch unit 27 is connected to the first drive unit input 23. To provide safety and desirable operating characteristics, this clutch unit 27 is preferably a hydraulic clutch of the fail-safe variety. That is, the hydraulic clutch is of the type which is urged into a disengaged condition by a spring or other mechanical device, and is urged into an engaged condition by hydraulic pressure. Such clutch units can be obtained from The Lambert Brake Corporation of St. Joseph, Michigan. The size and model designation will depend, of course, on other elements in the drive system and on the desired operating characteristics. Here, a model C clutch is used.

A first hydraulic motor 29 is connected to the clutch unit so as to drive the drive unit first input 23 through the clutch unit when the clutch unit 27 is engaged. This hydraulic motor 29 is of the fixed displacement variety. As is well known to those skilled in the art, a fixed displacement type hydraulic motor delivers a maximum, constant torque at all operating speeds. When this constant displacement motor 29 is used with a variable displacement pump, as described below, the maximum horsepower transmitted is directly proportional to the motor speed, and a variable speed and relatively constant torque transmission system is obtained. One such suitable motor is the Sundstrand piston-type, fixed displacement model 22 motor, offered by the Sundstrand Hydro-Transmission Division of Sundstrand Corporation, of Ames, Iowa.

Connected to the second drive input 24 is a brake unit 31. This brake unit 31 permits the drive system to provide rapid, smooth stops in emergency situations, and provides a parking brake feature. Preferably, this brake unit 31 is of the fail-safe variety, and is urged into a brake-engaged condition by springs or other positively acting mechanical devices carried within the brake unit 31 itself. The brake is disengaged by an overriding hydraulic pressure system. Such a brake unit can be obtained from the Lambert Brake Corporation of St. Joseph, Michigan. Again, the size and model designation will depend on the selection of other transmission components and the braking capacity desired. Here, a model C brake is used.

A second fixed displacement hydraulic motor 33 is connected to the brake unit 31 so as to drive the drive unit second input 24 through the brake when the brake is disengaged. This second hydraulic motor is desirably identical to the first motor 29.

Power is supplied to the hydraulic motors 29 and 33 by a variable displacement hydraulic pump 35, which can be driven by a prime mover 37. This pump can be a model 22 variable displacement pump offered by the same Sundstrand Corporation which offers the motors as described above. As illustrated particularly in FIG. 2, pressurized hydraulic fluid is delivered to the first hydraulic motor 29 and the second hydraulic motor 33 by a header conduit 40 and branch lines 41 and 42 as indicated by the flow arrows F. Fluid is returned to the variable displacement hydraulic pump 35 through branch lines 42a and 43 and a collector conduit 44. As shown in FIG. 1, electrical controls 45, powered by a battery 46 or other suitable electric generating means, can be used to provide proper operating characteristics in the pump 35 in known manner. By changing the pump displacement, the rate of pressurized fluid flow put out by the pump is changed, and the operating speed of the motors 29 and 33 (or motor 33 alone) is altered to provide an infinitely variable vehicle speed throughout the limits of each drive range.

When high drive torque is desired, both motors 29 and 33 are used in carrying out the invention. That is, fluid is delivered from the pumps 35 through the header conduit 40 to both hydraulic motors 29 and 33. High start-up torque but relatively low speed drive action results. The clutch 27 is operated so as to engage the motor 29 with the drive input shaft 23, and the brake 31 is disengaged. When high speed torque is desired, the first hydraulic motor 29 is disengaged by deactivating or de-clutching the clutch unit 27. The brake 31 remains, of course, disengaged to permit proper power transfer from the only operating hydraulic motor 33 to its input shaft 24.

To insure that all the pump flow is directed down the conduit 42 to the hydraulic motor 33 when the motor is to be operated alone, electrical solenoid on-off valves 47 and 48 are operated so as to isolate the first hydraulic motor 29. It may be noted that, while this description applies to what those skilled in the art term a closed loop hydraulic system, the invention will work with an open loop system as well.

Clutch operation is controlled by a three-way electric solenoid valve 49, which receives fluid from a charge pump 50 and routes the charging fluid either to the clutch 27 itself, or to an appropriate reservoir 51. Similarly, to operate the brake unit 31, a three-way electric solenoid valve 53 receives charging fluid from the charge pump 50 and directs the fluid to the brake unit 31 or, alternatively, to the reservoir 51.

When this invention is used, surprising improvements is available theoretical start-up torque and maximum speed can be obtained. For example, the Sundstrand Corporation shows, in its Bulletin 9565 Rev. D. of June, 1972, the following motor characteristics:

| | | PUMP | | |
|---|---|---|---|---|
| Model | Displacement (Cubic Inches) per revolution | Shaft Speed | Output flow (Gallons per min.) per 1000 rpm | Weight (Pounds) |
| 22 | 4.26 | 3200 | 18.4 | 135 |
| 24 | 7.24 | 2700 | 31.3 | 273 |
| | | MOTOR | | |
| Model | | Motor Torque (Foot-Pounds Per 1000 psi) | | Weight (Pounds) |
| 22 | | 56.6 | | 88 |
| 24 | | 96.0 | | 154 |

Typical drive requirements have, in the past, called for the use of a single model 24 pump and a single model 24 motor. In the exemplary embodiment of the present invention, however, one model 22 pump and two model 22 motors are used. The following surprising improvements are made available by using the invention:

| | New Small Dual Motors- Single Pump System | Old Large Single Motor- Single Pump System | Improvement of New System Over Old System |
|---|---|---|---|
| Theoretical | 113.2 foot | 96.0 foot | 17.9% |

| | New Small Dual Motors- Single Pump System | Old Large Single Motor- Single Pump System | Improvement of New System Over Old System |
|---|---|---|---|
| Start-Up Torque (Low Range): | pounds per 1000 p.s.i. | pounds per p.s.i. | |
| Maximum Motor Speed (High Range): | 3200 rpm | 2700 rpm | 18.5% |

These improvements are gained with but a modest increase in drive system weight. Because the cost of the pumps and motors increases rapidly as pump size and motor size increase, attractive financial savings can also be obtained.

The invention is claimed as follows:

1. A multi-speed drive for driving a driven motive member, comprising the combination of a drive unit having at least one output connectable to the motive member and having at least first and second inputs, a clutch unit connected to the first drive unit input, a first fixed displacement hydraulic motor connected to the clutch unit so as to drive the drive unit first input through the clutch when the clutch is engaged, a brake unit connected to the second drive unit input, a second fixed displacement hydraulic motor connected to the brake unit so as to drive the drive unit second input when the brake is disengaged, a variable displacement hydraulic pump, hydraulic circuit means for delivering the pressurized hydraulic fluid to the first and to the second hydraulic motors, and control valve means for distributing the pressurized hydraulic fluid to both the first and second motors to provide a relatively low speed, high torque drive for the motive member, and alternatively to the second motor only to provide a relatively high speed, low torque drive to the motive member.

2. A multi-speed drive according to claim 1 wherein said drive unit is a right-angle drive unit.

3. A multi-speed drive according to claim 1 wherein said clutch unit is a hydraulic fail-safe clutch unit including mechanical means for urging the clutch unit into a clutch-disengaged condition, and hydraulic override means for overriding the mechanical means and urging the clutch unit into a clutch-engaged condition.

4. A multi-speed drive according to claim 1 wherein said brake unit is a hydraulic fail-safe brake unit including mechanical means for urging the brake unit into a brake-engaged condition, and hydraulic override means for overriding the mechanical means and urging the brake unit into a brake-disengaged condition.

5. A multi-speed drive according to claim 1 wherein said drive additionally includes clutch charging means for providing a pressurized hydraulic fluid at a constant pressure, additional hydraulic circuit means for delivering hydraulic fluid from the charging means to the clutch, and valve means for selectively directing the hydraulic fluid to the clutch and alternatively away from the clutch to a reservoir for correspondingly urging the clutch into a clutch-disengaged condition and for alternatively permitting the clutch to reach a clutch-engaged condition.

6. A multi-speed drive according to claim 5 wherein said valve means comprises an electric solenoic valve.

7. A multi-speed drive according to claim 1 further including charging means for providing a pressurized hydraulic fluid at a constant pressure, additional hydraulic circuit means for delivering hydraulic fluid from the charging means to the brake, and valve means for selectively directing the hydraulic fluid to the brake so as to urge the brake into a brake-disengaged position, and alternatively for diverting fluid away from the brake to a reservoir to permit the brake to reach a brake-engaged condition.

8. A multi-speed drive according to claim 7 wherein said valve means comprises an electric solenoid valve.

9. A multi-speed drive for driving a driven motive member, comprising the combination of a driven unit having at least one output connectable to the motive member and having at least first and second inputs, a clutch unit connected to the first drive unit input, a first fixed displacement hydraulic motor connected to the clutch unit so as to drive the drive unit first input through the clutch when the clutch is engaged, a brake unit connected to the second drive input, a second fixed displacement hydraulic motor connected to the brake unit so as to drive the drive unit second input when the brake is disengaged, a variable displacement hydraulic pump, hydraulic circuit means for delivering the pressurized hydraulic fluid to the first and to the second hydraulic motors, control valve means for distributing the pressurized hydraulic fluid to both the first and second motors to provide a relatively low speed, high torque drive for the motive member, and alternatively to the second motor only to provide a relatively high speed, low torque drive to the motive member, charging means for providing a pressurized hydraulic fluid at a constant pressure, additional hydraulic circuit means for delivering hydraulic fluid from the charging means to the clutch, valve means for selectively directing the hydraulic fluid to the clutch and alternatively away from the clutch to a reservoir for correspondingly urging the clutch into a clutch-disengaged condition and for alternatively permitting the clutch to reach a clutch-engaged condition, additional hydraulic circuit means for delivering hydraulic fluid from the charging means to the brake, and valve means for selectively directing the hydraulic fluid to the brake so as to urge the brake into a brake-disengaged position, and alternatively for diverting fluid away from the brake to a reservoir to permit the brake to reach a brake-engaged condition.

* * * * *